lize the aforesaid lignin product as a dispersing agent (primary or secondary) for a large variety of materials and to attain the final object of an emulsion comprising the lignin product, aqueous alkali metal base or ammonium base solution, and the materials it is desired to emulsify. If the refined lignin product of the invention is used as the primary emulsifier, amounts ranging from about 1 to 10 per cent by weight of dry lignin product based on finished emulsion are sufficient, whereas if the lignin product is used as the stabilizer for an emulsion already containing a primary emulsifier (added or naturally contained), amounts ranging from about 0.25 to 5 per cent by weight based on finished emulsion are sufficient.

Numerous water-insoluble substances, such as fats, fatty oils, animal and vegetable waxes, mineral waxes such as montan wax and paraffin wax, natural and synthetic resins, asphalt, pitch and mineral oils can be advantageously emulsified by the method of this invention. Mixtures of bitumen, e. g., pitch or asphalt, with synthetic resins, e. g., alkyd or ureaformaldehyde resins, can also be advantageously emulsified by the method of this invention.

In stabilizing quick-setting bituminous emulsions of the type described in Montgomerie U. S. Patent No. 1,643,675, the quick-setting emulsion is preferably formed separately and a dispersion of refined lignin product in aqueous alkali metal or ammonium base solution is then added to convert the quick-setting emulsion to a mixing emulsion. In producing emulsions of bituminous substances which are not capable of forming Montgomerie emulsions, it is preferred to mix the bitumen and an aqueous alkali metal or ammonium base dispersion of refined lignin product together to form the emulsion.

The following specific examples will serve to illustrate the practice and the advantages of this invention:

EXAMPLE I

An aqueous alkaline solution of the product obtained from soda black liquor by the process described in Industrial and Engineering Chemistry, vol. 32, pages 1399–1400 (1940), said product being hereinafter referred to as "Lignin M," consisting of 1 part by weight of Lignin M, 2 parts by weight of water and 1⅔ per cent by weight of caustic soda based on the alkaline solution, was used to produce an emulsion of 18.5 parts by weight of a $^{150}/_{200}$ penetration asphalt derived from petroleum oil. The procedure was as follows: The alkaline solution of Lignin M was placed in a mix pot and heated to 150°–200° F. The $^{150}/_{200}$ penetration asphalt, at a temperature of 200°–240° F., was titrated into the alkaline solution and the mixture was meanwhile agitated. After all the asphalt had been added, the mixture was thinned by adding water to produce a finished emulsion having the following formula:

| | Percent by weight |
|---|---|
| $^{150}/_{200}$ Pen. asphalt | 55.00 |
| Lignin M | 3.00 |
| NaOH | 0.15 |
| Water | 41.85 |
| Total | 100.00 |

Tests were made on this emulsion with results as set forth in Table I below:

Table I

| | | |
|---|---|---|
| Residue | percent | 58.2 |
| Cement mixing test | grams | 0.0 |
| Demulsification | | 0.0 |
| Sieve test | percent | 0.02 |
| Viscosity | seconds | 50 |
| Settlement | percent | 1.0 |

EXAMPLE II

A quick-setting asphalt emulsion was prepared in the manner set forth in United States Patent No. 1,737,491 to Braun. Part of the emulsion was left unstabilized and part of the emulsion was stabilized with 1.0 per cent by weight based on total solids in the emulsion of Lignin M, added to the emulsion in the form of a 33⅓% (by weight) solution of Lignin M in dilute (1⅔%) aqueous caustic soda solution. Tests were made on these emulsions with results as set forth in Table II below:

Table II

| | Unstabilized Emulsion | Lignin M Stabilized Emulsion |
|---|---|---|
| Residue | 57.0% | 58.8%. |
| Cement mixing test | Complete break | 3 grams. |
| Demulsification | 100% break | 0.0. |
| Sieve test | 0.015% | 0.015%. |
| Viscosity | 40 seconds | 29 seconds. |
| Settlement | 1.0% | 1.0%. |
| pH | 11.5+ | 11.1. |
| Dehydration | 0.30 | 0.52. |
| Appearance after 1 week | O. K. | O. K. |

EXAMPLE III

Refined lignin products were prepared from soda black liquor by various methods, asphalt emulsions were stabilized with these products and the emulsions were submitted to tests. Details of these preparations, the emulsions and the emulsion tests are as follows:

One sample of this black liquor was diluted to 20% solids. Carbon dioxide was passed through it until the pH was 8.0 (requiring about 4 hours), the mixture was heated to 140° F. while being agitated and the mixture was then allowed to cool to room temperature while being agitated. The mixture was then filtered with suction on a Buchner funnel, the filtered precipitate was then washed with 0.5% aqueous sulfuric acid and then with large amounts of cold water. The filter cake was dried at 230° F. and ground to about 80% passing a 100 mesh sieve.

A second sample and a third sample were treated identically, except that in the second sample 10% aqueous sulfuric acid and in the third sample 10% aqueous acetic acid replaced the carbon dioxide.

The lignin products of the three samples were very similar in appearance. Data on the same are given in Table III below:

Table III

| Precipitating Agent | $CO_2$ | $H_2SO_4$ | $CH_3COOH$ |
|---|---|---|---|
| pH before heating | 7.95 | 8.0 | 8.1 |
| Per cent precipitated | 14.8 | 15.0 | 15.4 |
| Per cent solids precipitated | 26.1 | 26.5 | 27.1 |
| Per cent organic solids precipitated | 38.3 | 38.8 | 39.7 |

These lignin products were used to stabilize a quick-breaking asphalt emulsion (58% asphalt content). In each case, the lignin product was dispersed in caustic soda solution (one part lignin product in 3.7 parts of 0.7% aqueous NaOH), and the quantity of lignin product taken was equal to 1% of the weight of finished emulsion. A small amount (0.3% of finished emulsion) of boric acid was also added to adjust the pH of the emulsion. Test results were as follows:

Table IV

| Stabilizer | $CO_2$ pptd. product | $H_2SO_4$ pptd. product | $CH_3COOH$ pptd. product |
|---|---|---|---|
| Residue | 55.8 | 55.8 | 55.8 |
| Cement mixing test | pass | pass | pass |
| Sieve test: | | | |
| 20 mesh sieve | 0.040 | 0.030 | 0.030 |
| 40 mesh sieve | few shot | few shot | few shot |
| Viscosity | 26.5 | 25.5 | 26.5 |
| Settlement | 0.2 | 0.2 | 0.2 |
| pH | 9.3 | 9.2 | 9.3 |
| Dehydration | 0.337 | 0.426 | 0.354 |

EXAMPLE IV

Lignin products were prepared as follows from the same black liquor as in Example III:

Sample I was prepared by treating the black liquor with 10% aqueous sulfuric acid solution to a pH of 8.0 and allowing the mixture to stand 30 minutes without heating or agitation. The precipitate was filtered on a Buchner funnel and dried without washing. The filtration was difficult to accomplish because the precipitate had not been digested with the mother liquor but, nevertheless, it was capable of filtration. The yield of filter cake was 35.1% based on the black liquor.

Sample II was similarly prepared but the filter cake was washed repeatedly with large quantities of cold water. Yield of washed filter cake was 13.9% based on the black liquor.

Sample III was prepared by treating the black liquor with 10% aqueous sulfuric acid solution to a pH of 5.5. The precipitate was recovered and washed as in the case of Sample II. Filtration and washing were more easily accomplished than in the case of Samples I and II. However, whereas Samples I and II would dissolve completely in dilute aqueous caustic soda solution, Sample III would not dissolve completely therein. The yield of Sample III was 30.3% based on black liquor.

Each of these samples was used to stabilize a quick-breaking asphalt emulsion (same as in Example III). In each case, the lignin sample was first dispersed in caustic soda solution (one part lignin sample in 2.1 parts of 1% aqueous NaOH) and the quantity of lignin sample used was 1% of the weight of finished emulsion. A small amount (0.3% of the finished emulsion) of boric acid was also added to the emulsion to adjust pH. Test results are given in Table V below, along with test results for Lignin M (which was used in the same manner as the other lignin products).

Table V

| Stabilizer | Sample I | Sample II | Sample III | Lignin M |
|---|---|---|---|---|
| Residue | 56.2 | 56.2 | 56.6 | 56.0 |
| Cement mixing test | pass | pass | pass | pass |
| Sieve test (20 mesh) | ¹ 0.080 | 0.020 | ¹ 0.098 | 0.025 |
| Viscosity | 47.8 | 34.7 | 45.0 | 29.5 |
| Settlement | +0.8 | +1.0 | +0.8 | 0.2 |
| pH | 9.3 | 9.3 | 9.0 | 9.1 |
| Dehydration | 0.697 | 0.369 | 0.788 | 0.838 |

¹ Fine shot on sieve.

The tests referred to in Tables I, II, IV and V were as follows:

*Residue.*—The standard ASTM D244-40 distillation was employed, in which asphalt emulsion is distilled under prescribed conditions and the weight of residue is calculated and expressed as percentage of the original sample of emulsion.

*Cement mixing test.*—The tentative ASTM D244-41T cement mixing test was employed, in which asphalt emulsion is mixed with Portland cement, the mixture passed through a sieve, and the amount of material retained on the sieve is determined. This should not exceed 5 grams.

*Demulsification.*—The standard ASTM D244-40 demulsibility test was used, in which asphalt emulsion is mixed with 0.1 N $CaCl_2$ solution, the mixture passed through a sieve, and the weight of retained material is determined. The percentage demulsibility is the proportion (in per cent) of asphalt in the emulsion retained as residue on the sieve. or a full mixing emulsion (for mixing with soil and the like), the demulsibility should not exceed 2%, while for mixing with coarser aggregate, a higher demulsibility is permissible.

*Sieve test.*—The standard ASTM D244-40 sieve test was employed, in which asphalt emulsion is poured through a sieve and the residue on the sieve is determined. The percentage residue, based on the emulsion, should not exceed 0.1%.

*Viscosity.*—The standard ASTM D244-40 viscosity test was employed.

*Settlement.*—The standard ASTM D244-40 settlement test was employed, in which portions of asphalt emulsion are allowed to stand 5 days, small portions of emulsion are taken off from the top and bottom of the body of emulsion, and the numerical difference between the percentage asphalt residue in the top portion and the percentage asphalt residue in the bottom portion is determined. This numerical difference is the settlement value, and it should not exceed 3%.

*Dehydration.*—100 cc. of asphalt emulsion are placed in a cylindrical glass container having a flat bottom, a diameter of 80 millimeters and a depth of 40 millimeters. The container is placed in the center of a metal pan 5″ in diameter and is surrounded by 50 grams of dry flake calcium chloride spread out in the pan. The entire assembly is kept in an oven at 100° F. and at the end of 96 hours the glass container is removed, calcium chloride is wiped from its sides, and it is weighed. The percentage of water lost from the emulsion is calculated, and is expressed as a fraction of the original water content. It is desirable that this fraction (the dehydration value) be as high as possible, to promote rapid drying of the emulsion.

It will be seen, therefore, that the refined lignin products hereinabove described are capable of acting as primary emulsifiers (Example I) and as stabilizers for quick-setting emulsions (Examples II, III and IV).

Regarding the various lignin products of the invention, the following general conclusions may be drawn: The preferred products, obtained by acidification of the black liquor to a pH of about 7.8 to 9, followed by digestion of the precipitate with the mother liquor and washing with a weak aqueous solution of acid, such as sulfuric acid, and copious quantities of water to free the precipitate substantially completely of water-soluble products, are superior to products in which the digestion or washing steps are omitted. Thus, the preferred products contain less water-soluble matter, they dissolve more nearly completely in dilute aqueous alkali than some of the other products, they produce emulsions having higher dehydration figures and emulsions containing them are less likely to contain shot. However, the somewhat inferior lignin products in which digestion and/or washing steps are omitted, or the pH is carried below 7.8, are nevertheless operative to produce good mixing emulsions.

Although the refined lignin product described, in the presence of an aqueous alkali metal or ammonium base solution, serves alone as an efficient emulsifying agent and emulsion stabilizer, its action may be improved by methods well known in the art. Thus, referring to Example II, it will be seen that the dehydration value of the unstabilized emulsion was only 0.30 while that of the Lignin M stabilized emulsion was 0.52. However, for many purposes it is desirable to have a dehydration value of 0.6 or more. This can be readily accomplished by lowering the pH of the emulsion (11.1 in the stabilized emulsion of Example II) to 9 or less, preferably by the use of a weak acid such as boric acid or oxalic acid, but also by the use of a dilute solution of strong acid. By such means, dehydration values considerably above 0.6 can be obtained. Adjustment of pH also has the advantage of improving immediate mixing qualities of the emulsion. Colloidal clay, polyvinyl alcohol, starch, dextrin, agar and other substances which have the property of swelling in water may be advantageously added, usually in small amounts, preferably less than 1 per cent by weight of bitumen, to assist in suspending the refined lignin product of the invention. The refined lignin product may also be used in conjunction with other emulsifying agents and emulsion stabilizers, such as those mentioned hereinabove.

Herein and in the appended claims, the term "emulsion" includes dispersions of solids in liquids and liquids in liquids, and "emulsifying agent" and like terms include agents for producing and maintaining dispersions of solids in liquids and liquids in liquds. Also, the terms "alkali metal base" and "ammonium base," as hereinabove explained, are intended to include, respectively, the water-soluble alkali metal hydroxides and alkaline salts, and ammonia and water-soluble substituted ammonium bases (such as methylamine, triethanolamine, etc.). The term "soda black liquor" refers to the liquor produced in the soda process of paper pulp manufacture.

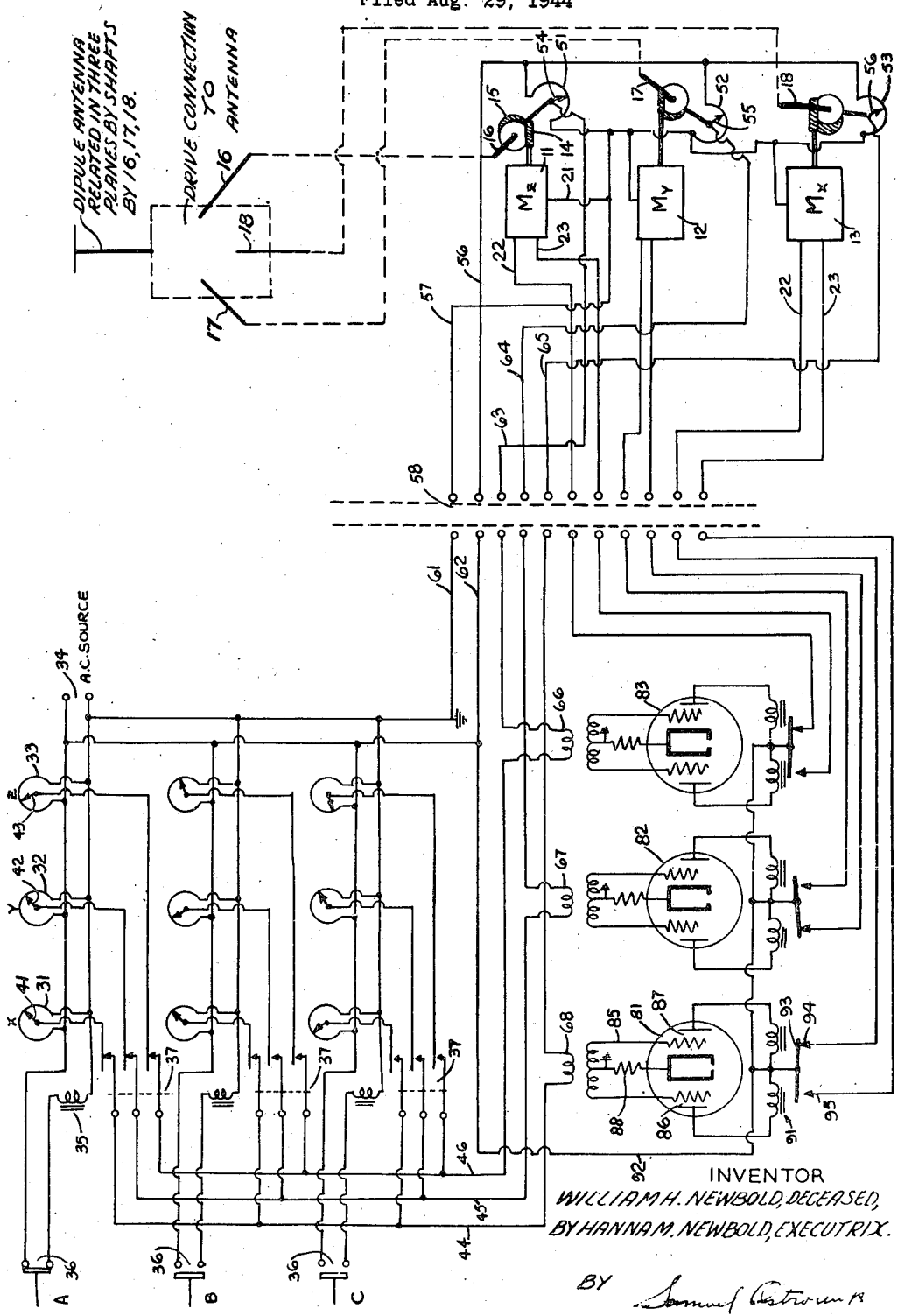

I claim:

1. A freely flowing, full mixing, non-fermentable, non-grainy oil-in-water type emulsion capable of mixture with fine aggregates without breakdown, comprising 50-70% by weight of water-insoluble, water-dispersible high molecular weight, thermoplastic organic material dispersed in 20-50% by weight of water and containing 0.25-10% by weight of a high molecular weight waste soda liquor derivative described as follows: substantially insoluble in water, benzene, carbon tetrachloride, ether, and 5.5-9.0 pH waste soda liquor: soluble in aqueous caustic solutions, diethylene oxide, phenols, acetone, ethyl alcohol: said waste soda liquor derivative being substantially free of ash, alkali metal salts, hemicelluloses and other low molecular weight organic compounds.

2. The composition of claim 1 in which the organic material is bituminous.

3. The composition of claim 1 wherein the organic material is bituminous and the soda liquor derivative is insoluble in soda liquor at a pH of about 7.8 to about 9.

4. The composition of claim 1 wherein the organic material is asphalt present in an amount of about 55 to about 65%.

5. The composition of claim 1 further characterized in that the organic material is asphalt and the emulsion is alkaline.

6. The composition of claim 1 wherein the organic material is asphalt and the emulsion is alkaline having a pH of less than about 9.

7. A freely flowing, full mixing, non-fermentable oil-in-water type emulsion capable of mixture with fine aggregates without breakdown, comprising 50-70% by weight of water-insoluble, water-dispersible high molecular weight, thermoplastic, organic material dispersed in 20-50% by weight of water and containing 0.25-10% by weight of a high molecular weight waste soda liquor derivative described as follows: substantially insoluble in water, benzene, carbon tetrachloride, ether, and 5.5-9.0 pH waste soda liquor: soluble in aqueous caustic solutions, diethylene oxide, phenols, acetone, ethyl alcohol: said waste soda liquor derivative being substantially free of ash, alkali metal salts, hemicelluloses and other low molecular weight organic compounds, said soda liquor derivative being produced by passing a carbon dioxide-containing gas into soda black liquor to reduce the pH to about 7.8 to 9 and precipitate a solid, coagulating the precipitated solid by heating it mildly in the presence of the mother liquor, filtering the liquor and solid precipitate, washing the precipitate, treating it with a dilute solution of strong mineral acid and in amount slightly in excess of that required to neutralize the precipitate, and washing it substantially free from water-soluble matter.

PAUL E. McCOY.

REFERENCES CITED

The following references are of record in the file of this patent:

UNITED STATES PATENTS

| Number | Name | Date |
| --- | --- | --- |
| Re 15,944 | Kirschbraun | Nov. 11, 1924 |
| 2,132,607 | Davis et al. | Oct. 11, 1938 |
| 2,228,976 | Reboult | Jan. 14, 1941 |
| 2,355,180 | Remy | Aug. 8, 1944 |